(12) United States Patent
Markwardt et al.

(10) Patent No.: US 8,280,138 B2
(45) Date of Patent: Oct. 2, 2012

(54) SYSTEM AND METHOD FOR PERFORMING BONE DENSITOMETER MEASUREMENTS

(75) Inventors: Paul Markwardt, Verona, WI (US); Randall Payne, Madison, WI (US); David Ergun, Verona, WI (US)

(73) Assignee: General Electric Company, Schenectady, NY (US)

( * ) Notice: Subject to any disclaimer, the term of this patent is extended or adjusted under 35 U.S.C. 154(b) by 470 days.

(21) Appl. No.: 12/557,275

(22) Filed: Sep. 10, 2009

(65) Prior Publication Data
US 2011/0058726 A1 Mar. 10, 2011

(51) Int. Cl.
*G06K 9/00* (2006.01)
(52) U.S. Cl. .............................. 382/132; 128/922; 378/4
(58) Field of Classification Search .................. 382/100, 382/128, 129, 130, 131, 132; 128/922; 378/4–27
See application file for complete search history.

(56) References Cited

U.S. PATENT DOCUMENTS

| | | | |
|---|---|---|---|
| 4,721,112 A * | 1/1988 | Hirano et al. ................. 600/436 |
| 6,081,582 A | 6/2000 | Mazess et al. | |
| 6,088,615 A | 7/2000 | Masuo | |
| 6,198,797 B1 | 3/2001 | Majima et al. | |
| 6,752,760 B2 | 6/2004 | Kouou | |
| 6,850,797 B2 | 2/2005 | Kawanishi et al. | |
| 6,978,170 B1 | 12/2005 | Onda et al. | |
| 7,065,235 B2 | 6/2006 | Dewaele | |
| 7,196,332 B2 | 3/2007 | Wear et al. | |
| 7,421,104 B2 | 9/2008 | Hsieh et al. | |
| 2003/0053673 A1* | 3/2003 | Dewaele ........................ 382/132 |
| 2003/0065264 A1* | 4/2003 | Tsoref et al. ................... 600/442 |
| 2005/0196031 A1* | 9/2005 | Hsieh et al. .................... 382/132 |
| 2005/0259882 A1* | 11/2005 | Dewaele ........................ 382/243 |
| 2006/0074288 A1 | 4/2006 | Kelly et al. | |
| 2008/0021349 A1 | 1/2008 | Sakai et al. | |
| 2008/0146961 A1 | 6/2008 | Okura et al. | |
| 2010/0128953 A1* | 5/2010 | Ostrovsky-Berman ....... 382/131 |

OTHER PUBLICATIONS

Cao et al., Digital Hand Atlas and Web-Based Bone Age Assessment: System Design and Implementation, Computerized Medical Imaging and Graphics 24 (2000) 297-307.
Gertych et al., Bone Age Assessment of Children Using a Digital Hand Atlas, Computerized Medical Imaging and Graphics 31 (2007) 322-331.
Bertin et al., Measurement of Visceral Adipose Tissue by DXA Combined With Anthropometry in Obese Humans, International Journal of Obesity (2000) 24, 263-270.
Sabharwal et al., Computed Radiographic Measurement of Limb-Length Discrepancy. Full Length Standing Anteroposterior Radiograph Compared With Scanogram, The Journal of Bone & Joint Surgery (2006)88, 2243-2251.
Pietka et al., Computer-Assisted Bone Age Asessment: Graphical User Interface for Image Processing and Comparison, Journal of Digital Imaging vol. 17 No. 3 (2004) 175-188.
Pietka et al., Integration of Computer Assisted Bone Age Assessment With Clinical PACS, Computerized Medical Imaging and Graphics 27 (2003) 217-228.
Pietka, Computer-Assisted Bone Age Assessment Based on Features Automatically Extracted From a Hand Radiograph, Computerized Medical Imaging and Graphics vol. 19 No. 3 (1995) 251-259.

* cited by examiner

*Primary Examiner* — Anand Bhatnagar (57) ABSTRACT

A system and method for performing skeletal age assessment is provided. The method includes scanning a hand and/or wrist of a patient using a dual-energy x-ray imaging system, acquiring density information of the hand and wrist using the scan, comparing the density information to at least one reference image, and automatically determining a skeletal age of the patient based on the comparison.

14 Claims, 4 Drawing Sheets

SYSTEM AND METHOD FOR PERFORMING BONE DENSITOMETER MEASUREMENTS

BACKGROUND OF THE INVENTION

The subject matter disclosed herein relates generally to medical diagnostic imaging systems, and more particularly, to a dual-energy imaging system configured to perform densitometry measurements.

Conventional imaging systems are utilized by a physician to assess various medical conditions. One such condition is to diagnose growth disorders that may be caused by hormone deficiencies. One common approach to diagnosing growth disorders is to generate a radiograph of the hand and wrist of a patient. The radiograph of the hand and wrist is used by the physician to determine the skeletal age of the patient. A difference between the skeletal age and the chronological age of the patient may indicate a delay in the growth of the patient. The delay may be caused by a hormone deficiency or some other deficiency.

There are two common methods of determining a skeletal age of the patient. The first method is the Greulich-Pyle (GP) method. The Greulich-Pyle method utilizes an atlas of reference pictures. Each reference picture in the Greulich-Pyle atlas includes a score that represents the developmental age of a particular bone in the hand or wrist. The atlas is typically a book that includes numerous pictures of various bones in the hand and wrist at various developmental stages. A physician selects a reference radiograph from the Greulich-Pyle atlas that best matches each site in the radiograph of the patient and uses a scoring system to produce a skeletal bone age of the hand and wrist, which is compared to the chronological age of the patient to diagnose growth disorders, etc.

Another method of determining a skeletal age of the patient is the Tanner-Whitehouse method. Similar to the Greulich-Pyle method, the Tanner-Whitehouse method requires the physician to select a reference radiograph from the Tanner-Whitehouse atlas that best matches each site in the radiograph of the patient, and uses a scoring system to produce a skeletal bone age of the hand and wrist which is compared to the chronological age of the patient to diagnose growth disorders, etc.

The image comparisons required in the Greulich-Pyle method and the Tanner-Whitehouse method are each time consuming and may produce inaccurate results. For example, each of the conventional methods requires a trained physician to manually select the reference images from the conventional atlases which rely on the physician's judgment when selecting the reference images. Moreover, selecting the reference images is relatively time consuming because the physician is required to search the atlas for each site to select a reference image that best represents that specific site. Therefore, measurements of the skeletal age of the same patient may vary from physician to physician.

BRIEF DESCRIPTION OF THE INVENTION

In accordance with an embodiment of the invention, a method for performing skeletal age assessment is provided. The method includes scanning a hand and wrist of a patient using a dual-energy x-ray imaging system, acquiring density information of the hand and wrist from the scan, comparing the density information to at least one reference image, and automatically determining a skeletal age of the patient based on the comparison.

In another embodiment, an age assessment module is provided. The age assessment module is programmed to scan a hand and wrist of a patient using a dual-energy x-ray imaging system to acquire density information of the hand and wrist, automatically compare the density information for a plurality of identified bones in the hand and wrist to a plurality of reference images stored in the electronic atlas, and automatically determine a skeletal age of the patient based on the comparison.

In a further embodiment, a dual-energy x-ray imaging system is provided. The imaging system includes a dual-energy x-ray source, a detector, and an age assessment module. The age assessment module is programmed to scan a hand and wrist of a patient using a dual-energy x-ray imaging system to acquire density information of the hand and wrist, automatically compare the density information for a plurality of identified bones in the hand and wrist to a plurality of reference images stored in the electronic atlas, and automatically determine a skeletal age of the patient based on the comparison.

DETAILED DESCRIPTION OF THE INVENTION

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. One or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Exemplary embodiments of a dual-energy x-ray imaging system and methods for determining an age of a skeleton are described in detail below. In particular, a detailed description of an exemplary dual-energy x-ray imaging system configured to perform densitometry measurements will first be provided followed by a detailed description of various embodiments of methods and systems for estimating skeletal age using the dual-energy x-ray imaging system.

At least one technical effect of the various embodiments of the system and method described herein is to automatically determine the skeletal age of a patient. The method and system utilize a dual-energy x-ray imaging system to generate a high resolution image. The high resolution image enables the system to more accurately measure bone structures within the hand and wrist. An age assessment module utilizes the information to determine a skeletal age of the patient.

Figure 1:
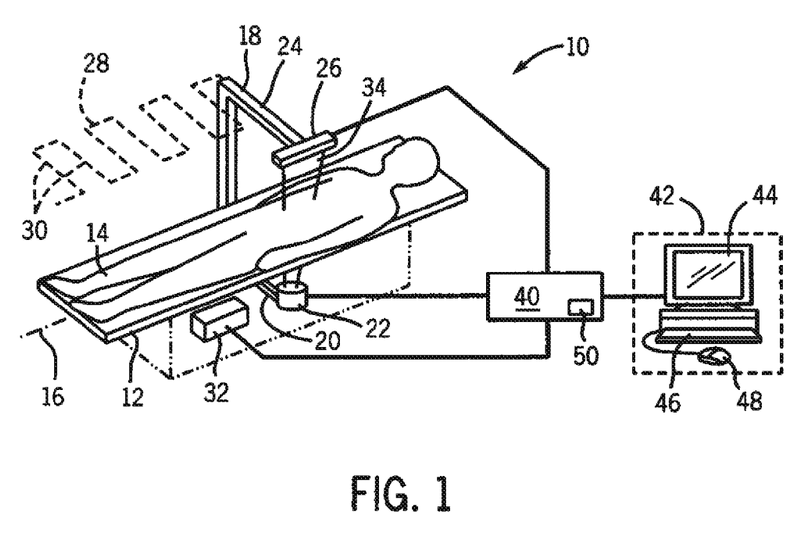
FIG. 1 is a block diagram of a dual-energy x-ray imaging system formed in accordance with various embodiments.

FIG. 1 is a block diagram of an exemplary dual-energy X-ray absorptiometry (DEXA or DXA) imaging system 10. The system 10 is constructed in accordance with various embodiments of the invention. The system 10 is configured to measure at least an area of a bone, a length of a bone, a bone mineral content (BMC), and a bone mineral density (BMD). The BMD is calculated by dividing the BMC by the area of the bone. During operation, two x-ray beams having differing energy levels are utilized to scan the bones. The absorption rate of the x-rays is used to calculate, among other things, the concentration of minerals, e.g. calcium, in the bones. Bones having a relatively high concentration rate are considered to be more dense. Bones having a relatively low concentration rate are considered more porous, and potentially at risk of fracturing. The data acquired from the scan is used to compute a T-score and/or a Z-score. The T-score compares the density of each scanned bone to the bone of a healthy person of the same gender. The Z-score accounts for various other factors such as age and ethnicity. Scores with negative numbers indicate that the bone has a relatively low BMD.

The system 10 includes a patient table 12 providing a horizontal surface for supporting a subject, for example a patient 14 in a supine or lateral position along a longitudinal axis 16. The system 10 also includes a support member, such as a C-arm 18. The C-arm 18 has a lower end 20 that is positioned beneath the patient table 12 to support an x-ray source 22. The C-arm 18 has an upper end 24 that is positioned above the patient table 12 supporting an x-ray detector 26. The x-ray detector 26 may be fabricated as a multi-element cadmium-zinc-telluride (CZT) detector providing for energy discrimination. The x-ray source 22 and the x-ray detector 26 may be moved in a raster pattern 28 so as to trace a series of transverse scans 30 of the patient 14 during which dual energy x-ray data are collected by the x-ray detector 26. The raster motion is produced by actuators (not shown) under control of a translation controller 32. During operation, the x-ray source 22 produces a fan beam 34 whose plane, in some embodiments, is parallel to the longitudinal axis 16. The raster pattern 28 is adjusted so that there is a slight overlap between successive scan lines of the fan beam 34.

The x-ray source 22, the x-ray detector 26, and the translation controller 32 communicate with, and are under the control of, a computer 40 which may include both dedicated circuitry and one or more processors having the ability to execute a stored program. In the exemplary embodiment, the computer 40 also includes a skeletal age assessment module 50. The module 50 utilizes the scan data or the scanned image to automatically perform skeletal age assessment of the scanned skeleton. During operation, the module 50 directs the dual-energy imaging system 10 to scan a portion of the patient. The density information acquired from the scan is utilized to generate a scan image of the skeleton or portions thereof. The scan image and/or the density information are compared to a plurality of digital reference images. The digital reference images are stored as a database, or electronic atlas on the computer 40 or another electronic storage medium. In some embodiments, the digital reference images are digital representations of an actual bone at a predetermined growth stage. In other embodiments, the digital reference images may be scanned images of an exemplary bone at the predetermined growth stage. In the exemplary embodiment, each digital reference image in the atlas is a digital representation of an ideal bone at a predetermined growth stage. Each reference image is assigned a score that is based on a priori knowledge of expected bone development of the reference bone.

The module 50 utilizes the scan data or scan image to select a reference image from the atlas. For example, the module 50 or the operator may select nineteen bones from the hand and/or wrist of the patient to determine the skeletal age of the patient. The nineteen scanned images or the scan data used to generate the nineteen scanned images are utilized by the module 50 to automatically select nineteen digital reference images from the atlas. Each digital reference image represents a respective bone in the skeletal region of interest. The module 50 utilizes a plurality of reference images selected from the atlas to generate a digital age assessment image of the scanned bones. The module 50 combines the scores of the nineteen reference images to generate the estimated age of the skeleton being imaged. The age assessment image includes a visual depiction of the hand and/or wrist. The age assessment image also includes the score assigned to each bone in the hand and/or wrist, and the total score representing the assessed age of the skeleton. It should be noted that although the various embodiments are described in connection with the dual-energy x-ray imaging system, the various embodiments are not limited to a dual-energy x-ray imaging system or a particular configuration thereof.

Referring again to FIG. 1, the computer 40 communicates with a terminal 42 including a display 44, a keyboard 46, and a cursor control device such as a mouse 48 allowing for operator input and the output of text and images to the operator. In one embodiment, the computer 40 is located remotely from the workstation 42. Optionally, the computer 40 may form a portion of the workstation 42. The computer is adapted to perform one or more processing operations. The acquired density information may be processed and displayed in real-time during a scanning session as the data is received. Additionally or alternatively, the data may be stored temporarily in a memory device on the computer 40 during a scanning session and then processed and displayed in an off-line operation. The information may also be stored in a long-term storage device, (e.g. a hard-drive or server) for later access, such as during a follow-up scan of the same patient. The display 44 includes one or more monitors that present patient information, including the scanned image and the age assessment image to the user for diagnosis and analysis. The displayed images may be modified and the display settings of the display 44 also manually adjusted using the keyboard 46, the mouse 48, or a touch screen icon on the display itself.

During operation, the system 10 is configured to operate in either a dual energy x-ray mode or a single energy x-ray mode. In the single energy mode, the x-ray source 22 emits x-rays at a narrow band of energies of a few keV and in the diagnostic imaging range of approximately 20-150 keV. In the dual-energy mode, the x-ray source 22 emits radiation at two or more bands of energy emitted simultaneously or in rapid succession, or a single broadband energy of more than a few keV over the diagnostic imaging range. The system 10 may be switched between the dual energy mode and the single energy mode by increasing or decreasing the x-ray source 14 voltage and/or current. The system may also be switched between the dual energy mode and to the single energy mode by removing or adding a K-edge filter.

The x-ray source 22 may be configured to output a fan beam of x-rays 34 as shown in FIG. 1. The x-ray source 22 may also be configured to output a pencil beam of x-rays (not shown), a cone beam of x-rays, or other configurations. The module 50 configures the system 10 to operate in either the single energy mode or the dual energy mode to determine the age of the skeleton. In the exemplary embodiment, the module 50 configures the x-ray source 20 in the single energy mode to enable higher resolution images to be generated. The higher resolution images may then be used to measure bone characteristics that include BMC and BMD. The higher resolution images have higher data density per pixel to permit improved measurement of bone density.

Figure 2:
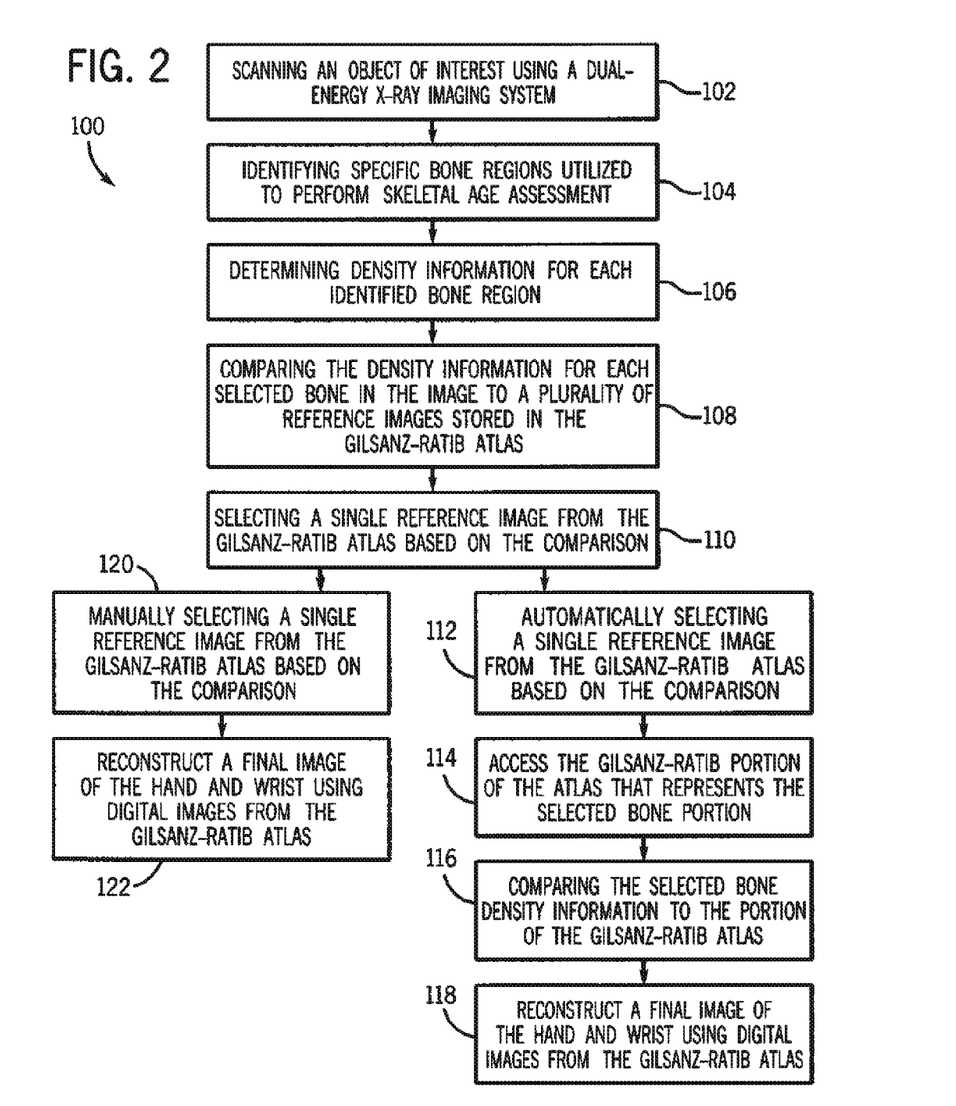
FIG. 2 is a flow chart illustrating an exemplary method of performing skeletal age assessment in accordance with various embodiments.

FIG. 2 is a flow chart illustrating an exemplary method 100 of performing skeletal age assessment. The method 100 includes scanning 102 an object of interest using a dual-energy x-ray imaging system. In the exemplary embodiment, the skeletal age assessment module 50 configures the system 10 to scan the patient in a single energy mode. The single energy mode enables the system 10 to generate high resolution images of the hand and wrist. The high resolution images increase the accuracy of the age assessment performed by the module 50. The density information acquired from the single energy scan is utilized to generate an image of the skeleton. An exemplary image 200 of a scanned hand and wrist is illustrated in FIG. 3.

Figure 3:
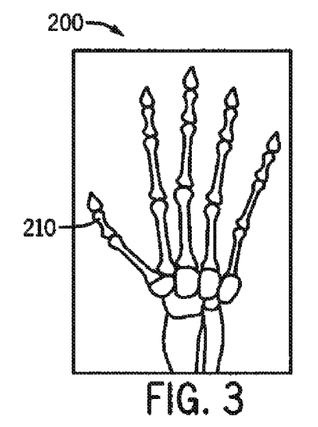
FIG. 3 is an exemplary image of a hand and wrist scanned using the method shown in FIG. 2.

As shown in FIG. 3, the image 200 is composed of the scan data acquired during the scanning operation at 102. The image 200 is associated with a scan of the hand and wrist. The image 200 is composed of data of a variety of scan lines associated with each of the rays detected by the x-ray detector 20. Bone density of other skeletal sites (for example, the metacarpal, the proximal phalanx, the middle phalanx, and/or the distal phalanx) may be measured. The measurements of each scan line produce measurements at a set of discrete pixels that represent a bone density along the ray line of that measurement. The bone density may be mapped to a gray scale to present the image 200 to the operator.

At 104 specific bone regions being utilized to perform skeletal age assessment are identified. In the exemplary embodiment, a number of specific bone regions identified is based on the atlas being used to perform the skeletal age assessment. If the Greulich-Pyle atlas is utilized, nine bone regions are identified. If the Tanner-Whitehouse atlas is utilized, thirteen bone regions are identified. In the exemplary embodiment, a Gilsanz-Ratib atlas is utilized and at least nineteen bone regions are identified.

Figure 4:
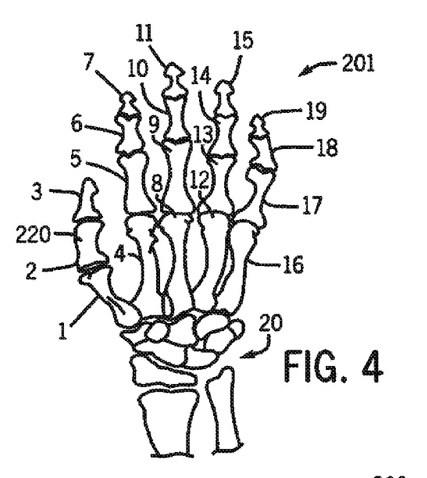
FIG. 4 is a generalized drawing of an exemplary hand and wrist of a patient.

FIG. 4 illustrates a drawing 201 of an exemplary bone structure of a hand and wrist of a patient. The hand and wrist image is the most common portion of the patient used to determine the skeletal age of the patient. The hand and wrist are composed of numerous bone regions. As shown in FIG. 4, the hand and wrist are composed of fourteen phalanges on each hand. A phalanx attached to a metacarpal is referred to as a proximal phalange. Phalanges at the tips of each finger and the thumb are referred to as distal phalanges. The four phalanges in the fingers that are connected to both a distal and proximal phalanx are referred to as middle phalanges. Additionally, there are five metacarpals that connect to proximal phalanges and carpals. Therefore, in the exemplary embodiment, the fourteen phalanges and the five metacarpals shown in the image 200 are each compared to a respective phalange or metacarpal in the Gilsanz-Ratib atlas to determine the skeletal age of the patient.

At 106, bone density information is generated for each selected bone. Specifically, the identified bone regions are each quantified to enable the module 50 to compare the bone portions of the image 200 to the images stored in the Gilsanz-Ratib atlas. As shown in FIG. 3, the image 200 includes the fourteen phalanges and the five metacarpals. To automatically identify a reference image in the Gilsanz-Ratib atlas that most closely corresponds with each respective phalange and metacarpal shown in FIG. 3, each phalange and metacarpal shown in FIG. 3 is quantified. Quantify as used herein, refers to the module 50 performing various measurements on each specific bone. For example, FIG. 3 shows the left hand having a first proximal phalange 210. The module 50 is configured to automatically identify a first proximal phalange 220 that most accurately represents the development of the first proximal phalange 210. The development of a bone structure is determined based on a plurality of factors. The factors describe the degree of maturation of the bones. The factors may include the length of the bone, the diameter of the bone, the BMC, the BMD, or other factors. To enable the module 50 to select a reference image from the Gilsanz-Ratib atlas that most accurately represents the development of the proximal phalange 210, the module 50 performs various measurements or quantifies the first proximal phalange 210.

To perform the various measurements, the operator first selects the bone regions to be quantified. In the exemplary embodiment, the module 50 utilizes a pattern matching algorithm for example to identify each of the bones in the hand and wrist. The pattern matching algorithm automatically identifies the various bones in the hand and wrist that are later used to select reference images from the atlas. The pattern matching algorithm may translate the bones, rotate selected bones, and/or scale the selected bones to facilitate generating a digital image of the bone that may be compared to a reference image.

The operator may then select the proximal phalange 210. The module 50 measures or quantifies the first proximal phalange 210. In the exemplary embodiment, the required measurements made of the selected bones are based on the atlas being used. The measurements are made for each selected bone, e.g. nineteen bones are selected to produce nineteen sets of measurements. Other measurements may include the bone mass content (BMC) and the bone mass density (BMD) for each selected bone region. In the exemplary embodiment, the module 50 may display a visual indicator around each selected bone to enable the operator to visualize which bone is selected and the various measurements made of each selected bone. The visual indicator may be represented as a box placed around the selected bone for example. The various measurements of each bone are saved as a separate set of parameters referred to herein as bone density information. As such, assuming nineteen bones are selected, the module 50 generates nineteen sets of bone density information, one set for each selected bone. In one embodiment, the sets of bone density information are utilized by the module 50 to automatically select a reference image from the Gilsanz-Ratib atlas as described in more detail below. Optionally, the module 50 utilizes the sets of bone density information to generate a visual representation of each respective bone. The operator then utilizes the visual representation to manually select a reference image from the Gilsanz-Ratib atlas.

Referring again to FIG. 2, at 108 the module compares the density information for each selected bone in the image 200 to a plurality of reference images stored in the Gilsanz-Ratib atlas. At 110, the module 50 automatically selects a single reference image from the Gilsanz-Ratib atlas based on the comparison. In the exemplary embodiment, the Gilsanz-Ratib atlas 300 includes various criteria or parameters to determine the skeletal age of the patient. The module 50 measures and/or identifies the same criteria or parameters for each selected bone in the scanned image 200. The measurements made of each bone in the scanned image 200 are then compared to the various criteria and parameters required by the Gilsanz-Ratib atlas.

Figure 5:
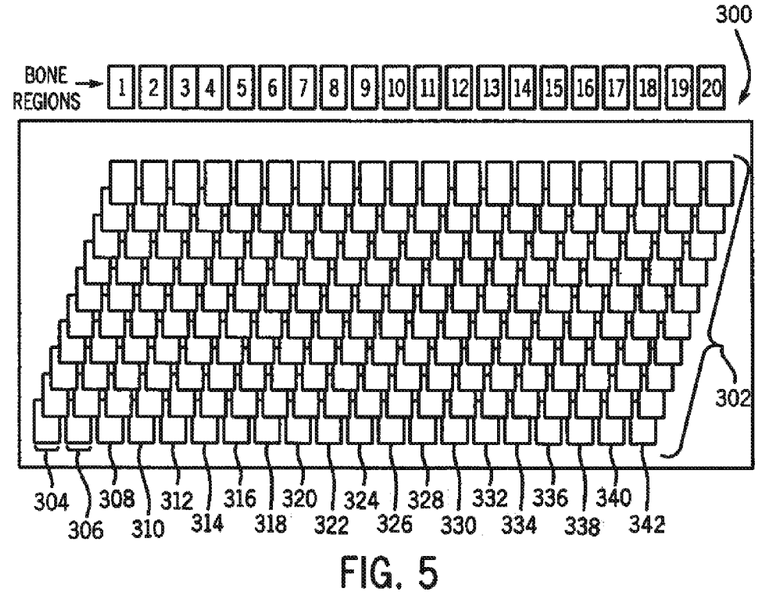
FIG. 5 is a pictorial illustration of an exemplary electronic atlas.

For example, FIG. 5 is a schematic illustration of an exemplary Gilsanz-Ratib atlas 300. The Gilsanz-Ratib atlas 300 includes a plurality of digitized images 302. Each digitized image 302 represents a specific bone or region in the hand or wrist at a certain developmental stage. As shown in FIG. 4, the hand and wrist are illustrated as having nineteen specific bone regions, labeled 1-19 and the wrist carpals, labeled 20. Therefore, the Gilsanz-Ratib atlas 300 includes twenty different bone regions, wherein each bone region represents one of the numbered bone regions 1-20 shown in FIG. 4.

More specifically, the Gilsanz-Ratib atlas 300 includes a set 304 of bone images that represent the different developmental growth stages of the first metacarpal (1) shown in FIG. 4. The Gilsanz-Ratib atlas 300 also includes a set 306 of bone images that represent the different developmental growth stages of the first proximal phalange (2), etc. In the exemplary embodiment, the Gilsanz-Ratib atlas 300 includes sets of bone images 304, 306, 308 . . . 342 that each respectively represent a developmental growth stage of one of the regions (1-20) shown in FIG. 4. In the exemplary embodiment, the images 302 are digitally created images of each bone at various developmental growth stages that may be displayed to the operator.

Referring again to FIG. 2, at 112, the module 50 is configured to automatically select a single reference image from the Gilsanz-Ratib atlas that most accurately represents the same bone shown in the scanned image 200. As discussed above, the selection is determined by comparing the parameters, e.g. the bone density information, identified in the scanned image for each bone to the bone density information defined in the Gilsanz-Ratib atlas 300 for the same bone. To automatically select a single reference image, the module 50 initially identifies the bone region selected by the operator. For example, assuming the operator selected the first metacarpal (1) shown in FIG. 4, at step 114, the module 50 accesses the set 304 of images that illustrate the developmental growth stages of the first metacarpal. At 116, the module 50 then compares the bone density information generated at step 106 to select a specific image in the set 304 that best represents the growth development of the first metacarpal shown in FIG. 3. In the exemplary embodiment, the images 302 are digital images to enable the module 50 to utilize an algorithm to automatically compare the bone density information of the selected bone to reference images 302 in the Gilsanz-Ratib atlas 300. The image of the first metacarpal (1) that is automatically selected from the Gilsanz-Ratib atlas 300 is then displayed in a scored image 348 shown in FIG. 6. The module 50 automatically selects an image 302 from the Gilsanz-Ratib atlas 300 for each selected bone region (1-20). At 118, the module 50 automatically generates the scored image 348 using the plurality of digital reference images 302 selected from the Gilsanz-Ratib atlas 300. The selected reference images, each representing a single bone region, are combined to form a single visual representation of the hand and wrist which is then displayed as the scored image 348 shown in FIG. 6. Moreover, as shown in FIG. 6, each selected bone region includes a score 350, 352, 354 . . . 388.

After the scored image 348 is generated, the scored image 348 may be displayed alongside the scanned image 200 as shown in FIG. 3 to enable the operator to assess the accuracy of the scored image 348. In one embodiment, if the operator determines that the scored image 348 is an accurate representation of the scanned image 200, as discussed above, the module 50 automatically calculates the skeletal age of the scanned hand and wrist by adding the scores 350, 352, 354 . . . 388 shown in the scored image 348. To determine if the scored image 348 is an accurate representation of the scanned image 200, the operator visually compares each bone in the scored image 348 to the same respective bone in the scanned image 200 to determine if the visual depiction of the bone in the scanned image 200 is approximately the same as the visual depiction of the same bone in the scored image 348. Specifically, the operator determines if the development of the bone in the scanned image 348 accurately reflects the actual bone development in the scanned image 200. Optionally, if the operator determines that at least a portion of the scored image 348 is not an accurate representation of the scanned image 200, the module 50 is configured to enable the operator to select a substitute image.

Figure 6:
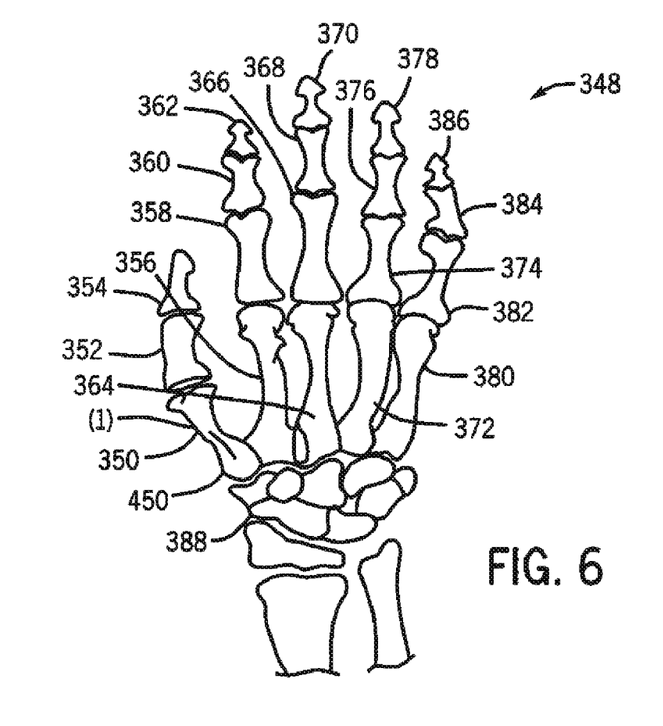
FIG. 6 is a scored image generated using the method shown in FIG. 2.
Figure 7:
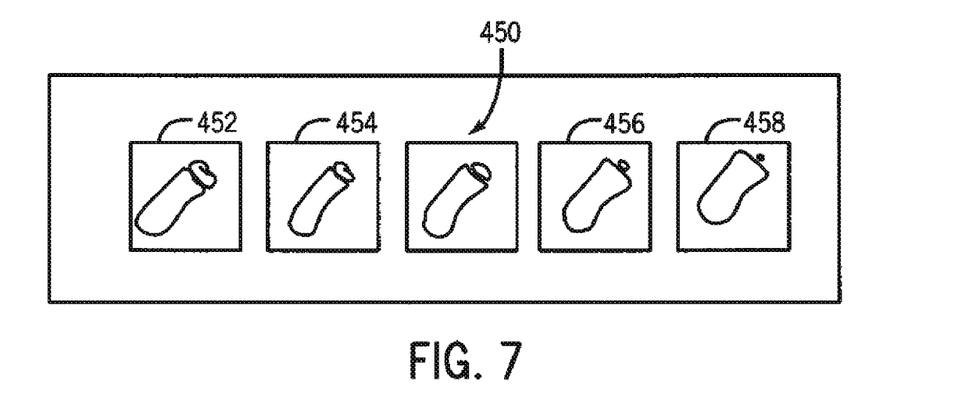
FIG. 7 is a pictorial illustration of exemplary images that may be substituted in the scored image shown in FIG. 6.

FIG. 7 is a pictorial illustration of exemplary images that may be substituted in the scored image 348 shown in FIG. 6. For example, the operator may determine that the reference image of the first metacarpal (1) that was automatically selected from the Gilsanz-Ratib atlas 300 and displayed in the scored image 348 does not accurately reflect the first metacarpal shown in the scanned image 200. That is, based on the operator's visual analysis, the reference image selected from the Gilsanz-Ratib atlas of the first metacarpal is not an accurate depiction of the first metacarpal shown in the scanned image 200. In this case, the operator may select the first metacarpal (1) on the scored image 348. The operator may select the first metacarpal by clicking on the portion of the image scored image 348, for example. In response to the operator selecting the first metacarpal on the scored image 348, the module 50 is configured to display other related images stored in the Gilsanz-Ratib atlas 300. In the exemplary embodiment, the module 50 accesses and displays a plurality of first metacarpal images stored in the Gilsanz-Ratib atlas 300. The operator may then select a substitute image to be used in the scored image 348. For example, assume that the scored image 348 includes a first metacarpal image 450. The operator may determine that the first metacarpal image 450 does not reflect the growth development of the first metacarpal shown in the scanned image 200 as discussed above. In this embodiment, the operator selects the first metacarpal image 450. In response to the selection, the module is programmed to access the Gilsanz-Ratib atlas 300 to obtain a plurality of reference images of the first metacarpal 452, 454, 456, and 458 each having a similar growth development. The operator may then select a substitute reference image from the set of reference images, e.g. image 454 that more clearly represents the growth development of the first metacarpal shown in the scanned image 200. In response to the selection of the substitute image 454, a revised scored image 348, including the substitute image 454 is displayed and a revised skeletal age score is calculated.

Referring again to FIG. 2, at 120 the operator may manually select a reference image from the Gilsanz-Ratib atlas for each bone region. In this embodiment, the operator manually selects a portion of the image 200. The module 50 compares the density information of the selected bone region to determine the reference bone selected. For example, based on the density information and the location of the selected bone, the module 50 may determine that the second metacarpal (4) is selected. In response to the selection, the module 50 accesses the Gilsanz-Ratib atlas 300 and displays each reference image of the second metacarpal (4) stored in the Gilsanz-Ratib atlas 300. The reference images of the second metacarpal (4) may be displayed sequentially or in groups or sets. The operator may then manually select the desired reference image from the displayed reference images. The module 50 automatically generates the scored image 348 based on the manual selections for each bone region entered by the operator. The selected images are then displayed as the scored image 348 in FIG. 5. The skeletal age of the patient is then automatically determined based on the scores in the scored image 348. At 122, the module 50 automatically generates the scored image 348 using the plurality of reference images 302 manually selected from the Gilsanz-Ratib atlas 300. The selected images are then displayed as the scored image 348 in FIG. 5.

Described herein is a dual-energy x-ray imaging system that includes an age assessment module. The module 50 controls the dual-energy x-ray imaging system to generate high-resolution scan data of a patient's hand and wrist. The high-resolution scan data is utilized to determine bone density information for the bones in the hand and wrist. The bone density information is then compared to a plurality of digital reference images stored in a digital atlas. The digital atlas enables the age assessment module to utilize an algorithm, such as the pattern matching algorithm to generate the bone density information of the scanned hand and wrist. This bone density information is then compared to bone density information in the digital Gilsanz-Ratib atlas to select a reference image that is most closely representative of each respective bone in the scanned image, thereby decreasing the amount of time required to determine the skeletal age of the patient. The age assessment module generates a depiction of the hand and wrist utilizing images retrieved from the digital atlas. In one embodiment, the age assessment module automatically retrieves reference images from the digital atlas. Optionally, the age assessment module enables the operator to automatically retrieve some reference images from the digital atlas, manually retrieve other reference images from the digital atlas, and/or manually replace some of the automatically retrieved reference images. The automatically retrieved and manually retrieved images may then be combined to form a scored image. The scored image of the hand and wrist is then automatically scored by the age assessment module to determine a skeletal age of the patient. The methods described herein are exemplary and other methods and comparison techniques may be used.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for performing skeletal age assessment, the method comprising:
    scanning at least a portion of a hand of a patient using a dual-energy x-ray imaging system;
    acquiring density information of the hand from the scan;
    comparing the density information to at least one reference image; and
    automatically determining a skeletal age of the patient based on the comparison.

2. A method in accordance with claim 1 wherein comparing further comprises automatically comparing the density information to a digital reference image stored in an electronic atlas.

3. A method in accordance with claim 1 wherein comparing further comprises automatically comparing the density information to a plurality of digital reference images stored in an electronic Gilsanz-Ratib atlas.

4. A method in accordance with claim 1 further comprising:
    identifying a plurality of bones in the hand and wrist based on the scan;
    comparing the density information for each of the respective plurality of identified bones to a plurality of digital reference images stored in an electronic atlas; and
    automatically determining the skeletal age of the patient based on the comparison.

5. A method in accordance with claim 1 wherein determining the skeletal age comprises:
    automatically selecting a reference image for each identified bone in the hand and a wrist; and
    automatically generating a scored image of the hand and wrist using the selected images.

6. A method in accordance with claim 1 further comprising automatically generating a scored image of the hand using a plurality of images selected from an electronic atlas, the scored image being used to determine the skeletal age of the patient.

7. A method in accordance with claim 1 further comprising:
    automatically selecting a reference image for each identified bone in the hand and a wrist; and
    manually replacing at least one of the selected images with a different reference image,
    automatically generating a scored image using the automatically selected reference images and the at least one different reference image.

8. A method in accordance with claim 1 wherein the comparing comprises utilizing a pattern matching algorithm to select the reference image.

9. A dual-energy x-ray imaging system comprising:
    a dual-energy x-ray source;
    an x-ray detector receiving x-rays emitted from the dual-energy x-ray source; and
    an age assessment module coupled to the x-ray detector, the age assessment module is programmed to:
        scan a hand and wrist of a patient using a dual-energy x-ray imaging system to acquire density information of the hand and wrist;
        automatically compare the density information for a plurality of identified bones in the hand and wrist to a plurality of reference images stored in an electronic atlas; and
        automatically determine a skeletal age of the patient based on the comparison.

10. The imaging system of claim 9, wherein the module is further programmed to automatically compare the density information for each identified bone to a plurality of digital reference images stored in an electronic atlas.

11. The imaging system of claim 9, wherein the module is further programmed to automatically compare the density information for each identified bone to a plurality of digital reference images stored in an electronic Gilsanz-Ratib atlas.

12. The imaging system of claim 9, wherein the module is further programmed to:
    automatically select a reference image for each identified bone from the electronic atlas, each reference image being assigned a score; and
    sum the scores for the reference images to determine a skeletal age of the patient.

13. The imaging system of claim 9, wherein the module is further programmed to:
    automatically select a reference image for each identified bone in the hand and a wrist; and
    receive an input to manually replace at least one of the selected images with a different reference image,
    automatically generate a scored image using the automatically selected reference images and the at least one different reference image.

14. The imaging system of claim 9, wherein the module is further programmed to utilize a pattern matching algorithm to select the reference image.

* * * * *